United States Patent [19]

Sitters et al.

[11] Patent Number: 5,356,731
[45] Date of Patent: Oct. 18, 1994

[54] MOLTEN CABONATE FUEL CELL WITH SINTERED LICOO2 ELECTRODE

[75] Inventors: Eric F. Sitters, Purmerend; Lambertus Plomp, Amsterdam, both of Netherlands

[73] Assignee: Stichting Energieonderzoek Centrum Nederland, Petten, Netherlands

[21] Appl. No.: 126,738

[22] Filed: Sep. 27, 1993

Related U.S. Application Data

[63] Continuation of Ser. No. 753,100, Aug. 30, 1991, abandoned.

[30] Foreign Application Priority Data

Aug. 30, 1990 [NL] Netherlands ............... 9001916

[51] Int. Cl.$^5$ .............................. H01M 4/86
[52] U.S. Cl. ........................ 429/45; 429/42; 429/44
[58] Field of Search ............... 429/45, 40, 42, 44, 429/127, 218

[56] References Cited

U.S. PATENT DOCUMENTS 4,567,031  1/1986  Riley .
4,770,960  9/1988  Nagaura et al. ............. 429/218 X

FOREIGN PATENT DOCUMENTS 0034447   8/1981  European Pat. Off. .
0061775  10/1982  European Pat. Off. .
0101422   2/1984  European Pat. Off. .
58-129771  8/1983  Japan .
1-217856   8/1989  Japan .

OTHER PUBLICATIONS

"Cathode of Molten Salt Fuel Cell", *Chemical Abstracts*, vol. 104, No. 2, Abstract 8319x, Jan. 1986, by T. Iwaki et al., p. 152.

"Molten-Carbonate Fuel Cell", *Chemical Abstracts*, vol. 103, No. 24, Abstract 198585f, Jun. 1985, by H. Koshina et al., p. 155.

"Oxygen Electrode Reaction at Au and at Semiconductor Monocrystalline NiO and CoO Electrodes in Molten Carbonates", *Bulletin Electrochem.*, vol. 4, No. 7, Jul. 1988, by L. Suski et al., pp. 635–638.

"Conducting Ceramic Oxides for Use as Molten Carbonate Fuel Cell Electrodes", *Journal of the Electrochemical Society*, vol. 133, No. 8, Aug. 1986, by P. A. Lessing et al., pp. 1537–1541.

Primary Examiner—John S. Maples
Attorney, Agent, or Firm—Young & Thompson

[57] ABSTRACT

An electrode suitable for use in a fuel cell, and a fuel cell containing such an electrode, is provided by a unitary sintered porous body containing $LiCoO_2$. The electrode is produced from a tape of $LiCoO_2$ powder and a binder. Platelets are cut from the tape and stacked and then sintering is conducted in an atmosphere containing 60–80% air and 40–20% carbon dioxide.

1 Claim, 1 Drawing Sheet

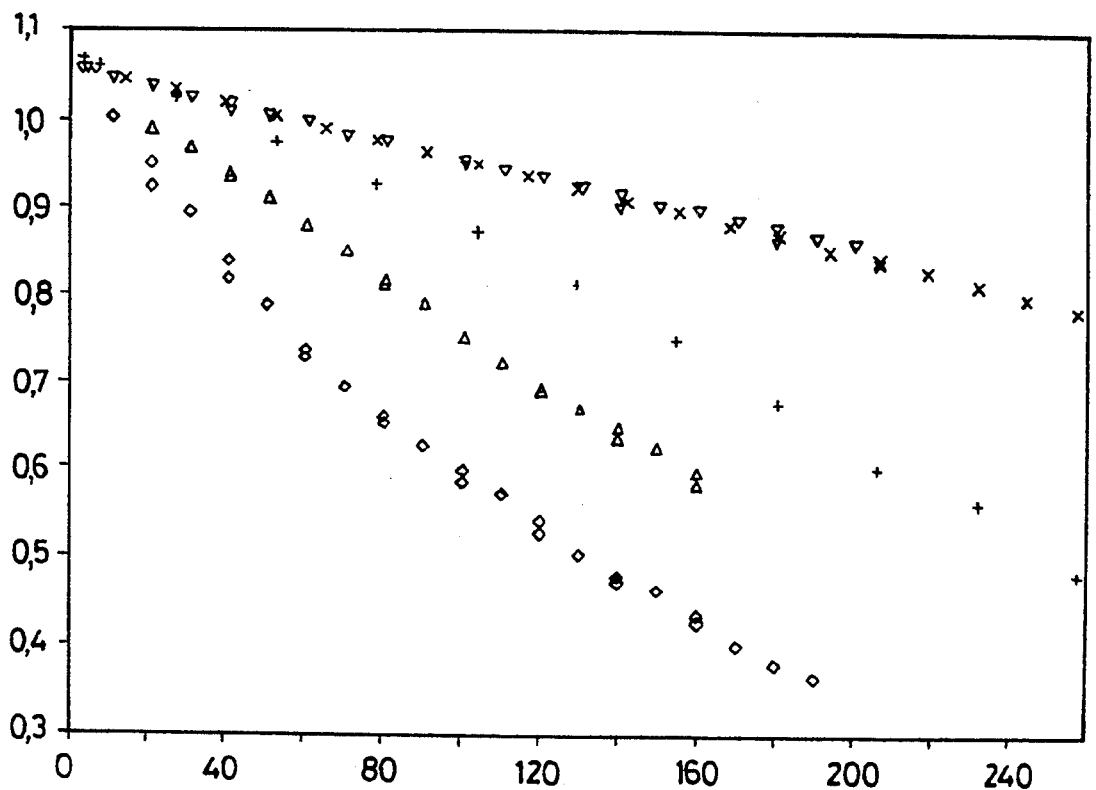
Cell potential (V) as a function of current density (mA/cm$^2$);
+ LiCoO$_2$ at 650°C,
◇ LiFeO$_2$ at 650°C,
× LiCoO$_2$ at 700°C,
△ LiFeO$_2$ at 700°C,
▽ NiO at 650°C,

MOLTEN CABONATE FUEL CELL WITH SINTERED LICOO₂ ELECTRODE

This application is a continuation of application Ser. No. 07/753,100, filed Aug. 30, 1991, now abandoned.

Tape suitable for use in fuel cells, electrode suitable for use in a fuel cell, method for sintering an electrode of this type and a fuel cell provided with an electrode of this type.

The invention relates to an electrode suitable for use in a fuel cell and to a fuel cell which contains an electrode of this type.

Fuel cells are generally known and are becoming increasingly important in connection with economical energy conversion.

A promising type of fuel cell is the molten carbonate fuel cell, which places high demands on electrodes. The aim is, inter alia, to obtain cathodes which have a low overpotential and which also have long-term stability against the effects of the electrodes used in such a cell.

The use of a cathode of lithium-containing nickel oxide (NiO) is known.

A tape has now been found which is characterized in that said tape contains $LiCoO_2$. A tape of this type can be produced in a manner known per se using $LiCoO_2$ and a binder. Expediently, a plasticizer and/or dispersant and/or anti-foam anti-foaming agent is used together with the binder, as is known pere se for the preparation of tapes.

Platelets can be produced from such a tape, which platelets can then be sintered, optionally after stacking. Sintering is expediently carried out in an atmosphere consisting of 60 to 80% air and 40 to 20% carbon dioxide, in particular 68 to 72% air and 28 to 32% carbon dioxide. A suitable temperature program is chosen for sintering. Good results are obtained by heating to 250° C. at a heating rate of 100° C. per hour, then heating to 450° C. at a heating rate of 50° C. per hour, then heating at a heating rate of 100° C. per hour to the desired sintering temperature of 800° to 1000° C. and finally, after sintering, cooling to room temperature at a rate of 100° C. per hour. Of course, the invention also relates to fuel cells which are provided with a material according to the invention.

Carbon is incorporated in the tape in order to give the material the desired porosity. The carbon is in the form of grains having an average size of 30 to 34 micrometers and is incorporated in an amount of 10 to 40% by weight.

The carbon burns during sintering and then leaves openings behind.

EXAMPLE I

The starting material used was 1 mol of metal solution consisting of 0.5 mol of Li originating from $LiNO_3$ and 0.5 mol of Co originating from $Co(NO_3)_2.6H_2O$ to which 1.5 mol of citric acid and 2.25 mol of ammonium nitrate have been added.

The starting materials are dissolved in demineralized water, with stirring and gentle warming. A 1.5 liter stock solution is made in order to prepare 100 g of pyrolyzed powder. Per ignition 75 ml are introduced into the 3 l elongated (quartz) beaker. In order to prevent condensation on the walls, the beaker is wrapped in heating tape.

The solution in water is evaporated with (magnetic) stirring until a viscous solution has formed. The stirrer disc is removed and the beaker is covered with a gauze. The solution is evaporated further until it starts to swell and spontaneous ignition takes place. After ignition, the heating is switched off and the powder formed is collected. The powder obtained, optionally in combination with the powder originating from other similar preparations, is kept at 500° C. for 8 hours in order to remove the carbon formed during the pyrolysis.

Determinations by X-ray diffraction showed that the powder, which still contained carbon, contains $Li_2CO_2$ and Co. Determinations by X-ray diffraction after removal of carbon by burning to completion showed that $LiCoO_2$ has been formed.

In order to prepare a suspension, the required amount of $LiCoO_2$ (50 g) is mixed in a polythene bottle (500 ml) with the amount of carbon used (20 g). 450 $ZrO_2$ balls and an amount of binder (Cerbind) which is sufficient to allow the balls to move freely (100 g) are then added. This binder also contains plasticizer dispersant, anti-foaming agent and the like (that is to say the usual additives for the production of tape). The mount of binder used depends on the amount of carbon (see Table A). Dichloromethane ($CH_2Cl_2$) is added for dilution. The mixture is then rolled for 2 hours on a roller bench (90 revolutions per minute).

The suspension is poured off from the balls, freed from air under reduced pressure and then processed on a teflon-coated glass plate to give a tape. The tape casting speed is 1.25 m/min. The leading blade is set at 2.25 mm and the second blade at 2.00 mm. After the tape has formed, the tape is dried in air for some time under a drying cap.

TABLE A

| Data on starting materials for suspension preparation | | | |
| --- | --- | --- | --- |
| Powder (g) | Carbon (g) | Binder (g) | $CH_2Cl_2$ (g) |
| 50.00 | 7.50 | 100.23 | 25.19 |
| 60.75 | 9.14 | 241.60 | 60.00 |
| 62.34 | 1.37 | 201.30 | 49.20 |
| 42.54 | 10.61 | 100.00 | 25.05 |
| 60.00 | 15.01 | 166.68 | 80.02 |
| 42.57 | 10.64 | 99.37 | 50.97 |
| 49.50 | 24.08 | 140.37 | 59.03 |
| 47.31 | 0.00 | 80.00 | 47.56 |
| 50.59 | 33.79 | 176.13 | 54.84 |

Prior to sintering, a number of circular platelets of the desired diameter (depending on shrinkage) are punched from the tape to be used. These platelets are placed on top of one another and, under a gas mixture of 70% air and 30 $CO_2$ (dry cathode gas) in a tubular furnace, are heated to 250° C. at 100° C. per hour, from 250° to 450° C. at 50° C. per hour and finally to the desired sintering temperature (between 800° C. and 1000° C.) at 100° C. per hour. After sintering, the stack is cooled to room temperature at 100° C. per hour. The sintering platelets are characterized with the aid of X-diffraction, electromicroscopy, atomic absorption spectroscopy and Hg porosimetry.

In the same way as $LiCoO_2$, $LiFeO_2$ was also produced and processed to form electrodes.

EXAMPLE II

Cathodes were produced by means of tape casting from an $LiCoO_2$ powder and an $LiFeO_2$ powder. The cathodes obtained were tested in laboratory cells having a surface area of 3 $Cm^2$. The results obtained using these materials and the results obtained using the known NiO cathode are shown in Table B and the figure.

For comparison, the figures for known, lithium-containing NiO cathodes are included in the Table.

It can be seen from the data that $LiFeO_2$ cathodes show a poor cell performance, which is essentially independent of the porous microstructure. The ohmic losses are high (about 4 times those of a conventional NiO cathode). The poor performance is mainly the consequence of a high polarization (6 times that of NiO). At 650° C. the cell performance is poor. Raising the cell temperature to 700° C. does give an improvement in the cell performances as a consequence of the reduction in the polarization, as a result of which a more linear IV characteristic is obtained. The $LiFeO_2$ cathodes used here are doped with 3 mol % magnesium. Repeating the test with cathodes to which Co has been added in place of Mg leads to hardly any change in the characteristics.

An appreciably better performance is obtained in the case of the $LiCoO_2$ cathode. The polarization is appreciably lower.

Table C shows several current densities which are obtained for the total surface area as determined using Hg porosimetry. It can be seen from the results that the characteristics of NiO cathodes are predominantly controlled by the mass transfer ($i_o/i$, approximately 5). It was indeed already known that the kinetic characteristic of NiO cathodes is fast. In the case of $LiCoO_2$ cathodes mass transfers and kinetic characteristic are approximately equally significant ($i_o/i$, approximately 2). $LiFeO_2$ cathodes are mainly controlled by kinetic characteristic ($i_o/i$, approximately 0.03). At a temperature of 700° C. the characteristic of the $LiCoO_2$ cathode is more controlled by the mass transfer. The limiting current density $i_1$ is mainly determined by the transport characteristic of reactants and products in the carbonate (film) of the moistened electrode. Consequently it is expected that $i_1$ is dependent on the porous microstructure and only to a lesser extent on intrinsic material characteristics. The temperature will also have a small effect unless chemical reaction occur in the carbonate film, which reactions have a highly temperature-dependent rate of reaction. It is pointed out that the $i_1$ values which are obtained are all of the same order of magnitude. The porous microstructure of $LiCoO_2$ and $LiFeO_2$ are also very similar to one another.

| Cathode material | T = 650° C. | | | T = 700° C. | | |
|---|---|---|---|---|---|---|
| | $V_{cel}$ (mV) | $\eta_{kath}$ (mV) | $(iR)_{kath}$ (mV) | $V_{cel}$ (mV) | $\eta_{kath}$ (mV) | $(iR)_{kath}$ (mV) |
| $LiFeO_2$ | 435 | 357 | 148 | 530 | 250 | 140 |
| $LiCoO_2$ | 745 | 80 | 180 | 880 | 50 | 80 |
| NiO | 900 | 53 | 35 | 900 | 53 | 35 |

TABLE C

| Cathode material | $A_{eff}$ (m²) | T = 650° C. | | | T = 700° C. | | |
|---|---|---|---|---|---|---|---|
| | | $i_0/i_1$ | $i_0$ (mA/cm²) | $i_1$ (mA/cm²) | $i_0/i_1$ | $i_0$ (mA/cm²) | $i_1$ (mA/cm²) |
| NiO | 0.22 | 5.0 | 3.4 | 0.7 | — | — | — |
| $LiCoO_2$ | 0.15 | 2.0 | 1.0 | 0.5 | 41 | 36 | 0.9 |
| $LiFeO_2$ | 0.15 | 0.03 | 0.05 | 1.3 | 1.2 | 0.5 | 0.4 |

We claim:

1. A molten carbonate fuel cell containing an electrode which is a unitary sintered porous body of $LiCoO_2$.

* * * * *